(12) United States Patent
Robinson et al.

(10) Patent No.: US 6,964,209 B2
(45) Date of Patent: Nov. 15, 2005

(54) SENSOR MOUNT ATTACHMENT DEVICE

(75) Inventors: Christopher J. Robinson, Groveland, IL (US); Jonathan Wheat, Peoria, IL (US)

(73) Assignee: 4B Elevator Components, Ltd., East Peoria, IL (US)

( * ) Notice: Subject to any disclaimer, the term of this patent is extended or adjusted under 35 U.S.C. 154(b) by 75 days.

(21) Appl. No.: 09/862,225

(22) Filed: May 22, 2001

(65) Prior Publication Data

US 2002/0175251 A1  Nov. 28, 2002

(51) Int. Cl.[7] .............................................. G01D 21/00
(52) U.S. Cl. ..................................... 73/866.5; 324/262
(58) Field of Search ............................... 73/866.5, 493; 324/207.25, 166–168, 173, 174, 178, 179, 324/262; 248/309.4

(56) References Cited

U.S. PATENT DOCUMENTS

| 4,466,196 | A | * | 8/1984 | Woodruff ..................... 356/152 |
| 5,048,954 | A | * | 9/1991 | Madey et al. ................ 356/155 |
| 5,076,102 | A | * | 12/1991 | Sato et al. ................... 73/866.5 |
| 6,109,120 | A | * | 8/2000 | Robinson et al. ............ 73/866.5 |
| 6,534,979 | B1 | * | 3/2003 | Wineland ...................... 324/262 |

* cited by examiner

Primary Examiner—John E. Chapman
Assistant Examiner—Nashmiya Fayyaz
(74) Attorney, Agent, or Firm—Kajane McManus

(57) ABSTRACT

The attachment device includes a base plate which is magnetically engaged to an end of a rotating shaft, the plate having a centered collar which is coaxial with the axis of the shaft and is configured to engage a rotatable spindle of a sensor mount to the shaft, with the spindle being rotated by rotation of the shaft.

10 Claims, 4 Drawing Sheets

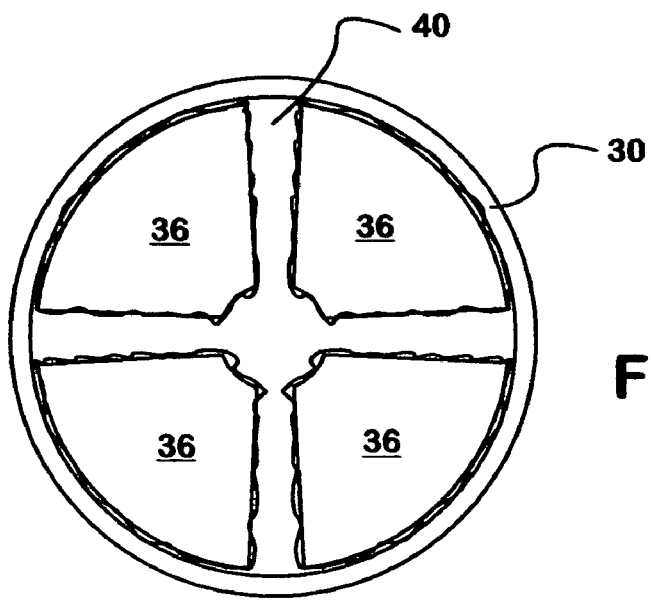
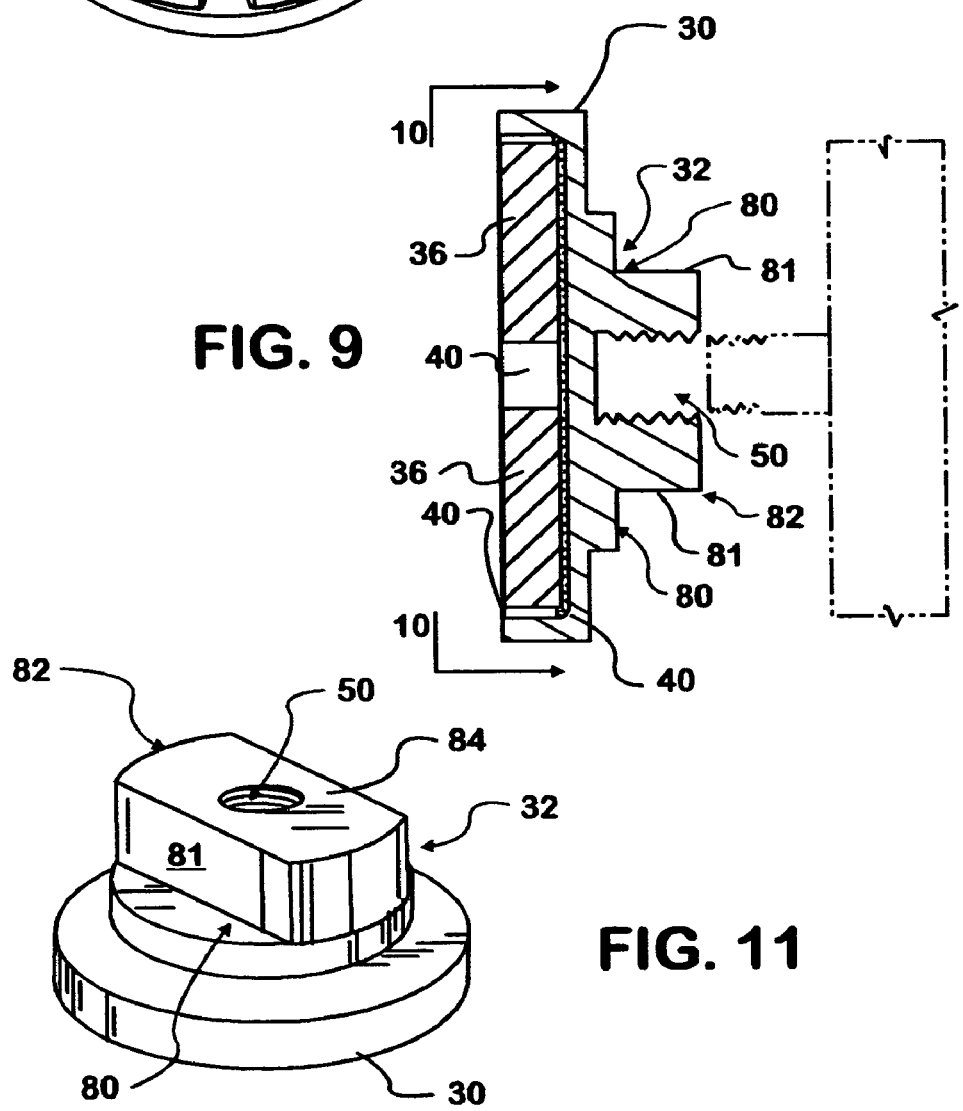
FIG. 10
FIG. 9
FIG. 11

SENSOR MOUNT ATTACHMENT DEVICE

BACKGROUND OF THE INVENTION

1. Field of the Invention

The present invention relates to a device for attaching a rotational sensor, engaged to a mount for same, to an end of a rotating shaft. More particularly, the device eliminates the need for drilling into the end of the shaft for engagement of the sensor mount thereto.

2. Prior Art

Heretofore, a mount for engaging a rotational sensor to an end of a rotating shaft has been proposed.

One such mount is disclosed in U.S. Pat. No. 6,109,120, entitled Universal Active Shaft Sensor Mounting Assembly, the teachings of which are incorporated herein by reference.

Engagement of the cited mount has heretofore required drilling of a centered threaded bore, axially, into an end of a rotating shaft to which the sensor mount is to be attached.

As will be described in greater detail hereinafter, the attachment device of the present invention eliminates the need for drilling the threaded bore into the shaft end.

SUMMARY OF THE INVENTION

According to the invention there is provided an attachment device for engaging a sensor mount including a rotatable spindle to an end of a rotating shaft, the device comprising a base plate including magnets therein and a centered collar extending outwardly of the base plate, the collar having a bore therein for functionally engaging the spindle of the sensor mount, with the magnets in the base plate engaging the device to the end of the rotating shaft in a manner such that the spindle is axially aligned with and rotated by rotation of the shaft.

BRIEF DESCRIPTION OF THE DRAWINGS

FIG. 9 is a cross sectional view through a preferred embodiment of the device.

FIG. 10 is a perspective view of the device taken along line 10—10 of FIG. 9.

FIG. 11 is a perspective view opposite that of FIG. 10.

DESCRIPTION OF THE PREFERRED EMBODIMENTS

Figure 2:
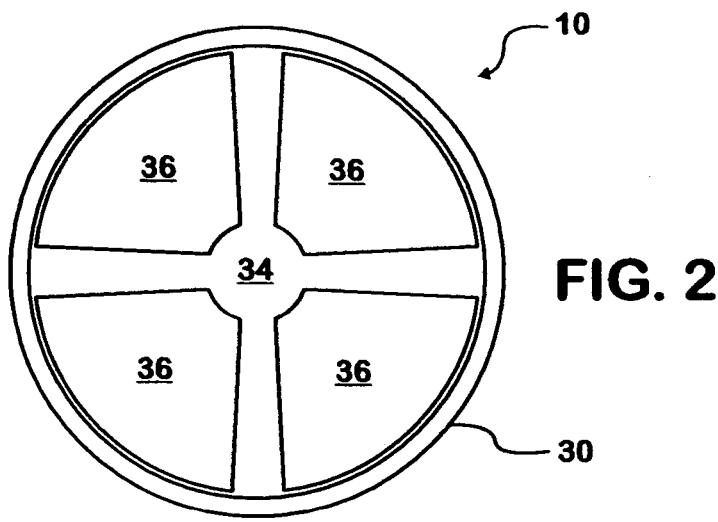
FIG. 2 is a perspective view of the device taken along line 2—2 of FIG. 1.

Referring now to the drawings in greater detail there is illustrated therein an attachment device generally identified by the reference numeral 10, for use in attaching a mount 12 for a rotational sensor (not shown) to an end 14 of a rotatable shaft 16.

The mount 12 is seen to incorporate a rotating spindle 18 having a threaded end 20 which must be mounted to the end 14 of the shaft 16, to be rotated thereby, as described in the above mentioned U.S. Pat. No. 6,109,120, the teachings of which are incorporated herein by reference.

As stated above, such mounting of the spindle 18 has previously necessitated creation of a correspondingly threaded axial bore in the end 14 of the shaft 16 to which the mount 12 is to be engaged via the spindle 18 thereof.

As will be defined in greater detail hereinbelow, provision of the attachment device 10 of the present invention eliminates the need for boring into the end 14 of the shaft 16.

Turning now to the Figures in greater detail, it will be seen that the attachment device 10 includes a base plate 30 and a collar 32.

The base plate 30 is saucer-like and has a hollowed-out face 34 within which a plurality of radially arrayed magnets 36 are fixed. Such fixation may be accomplished by any suitable means, with the method of choice disclosed herein being by bonding of the magnets 36 to the base plate 30, within the hollowed-out face 34 thereof, through the use of an epoxy compound 40.

It will be understood that the attachment device 10, may be of various embodiments, and three exemplary embodiments are disclosed, which particular embodiments should not be construed as limiting.

Figure 1:
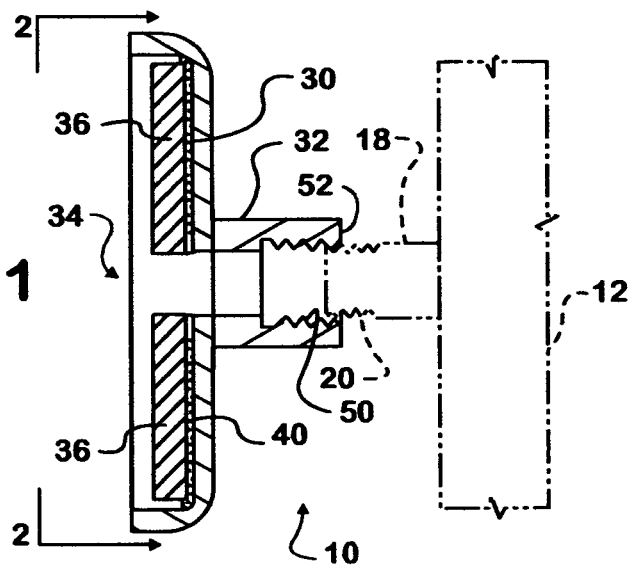
FIG. 1 is a cross sectional side view through one embodiment of the attachment device showing a sensor mount engaged thereto in phantom.
Figure 3:
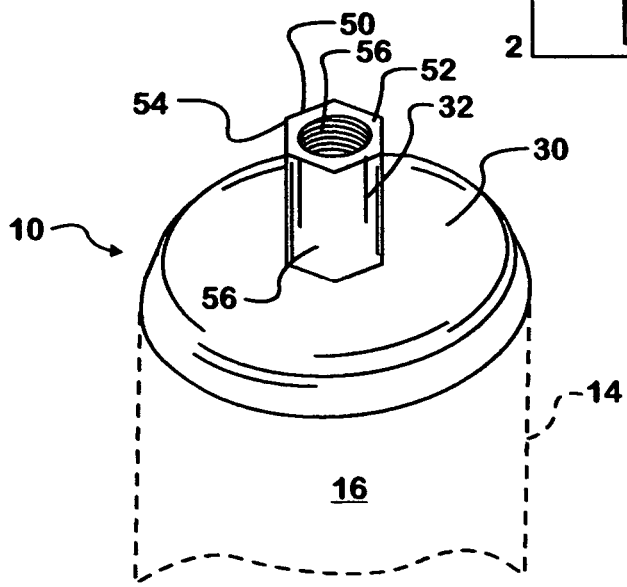
FIG. 3 is a perspective view opposite that of FIG. 2, showing a base of the device mounted to an end of a rotating shaft, illustrated in phantom.

In FIGS. 1–3, it will be seen that the base plate 30 and collar 32 are formed as a unit, with the collar 32 being centered and having a threaded bore 50 extending thereinto from a free end 52 thereof, within which threaded bore 50, the threaded end 20 of the spindle 18 is engaged.

In this embodiment, the collar 32 is shown to have an outer periphery 54 which is substantially rounded, with two opposed flats 56 being incorporated for gripability thereof by a hand tool (not shown).

Figure 5:
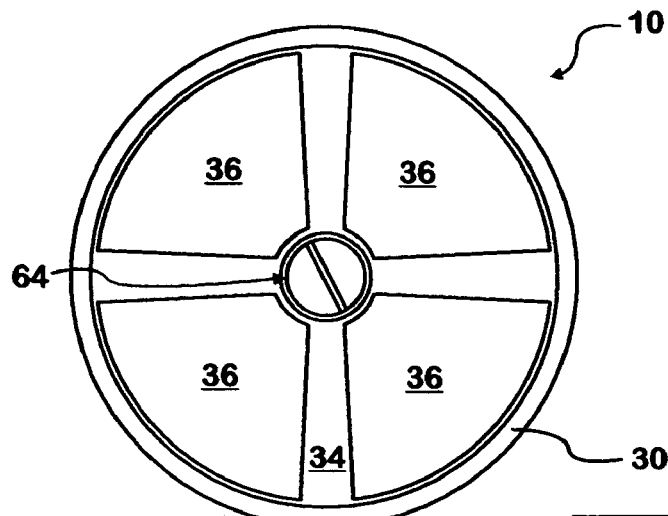
FIG. 5 is a perspective view of the device taken along line 5—5 of FIG. 4.
Figure 4:
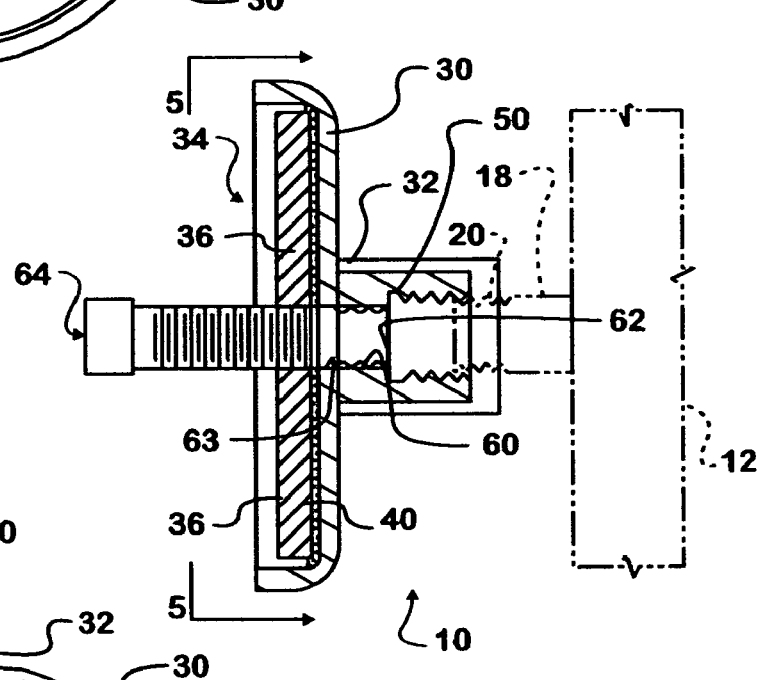
FIG. 4 is a cross sectional view through a second embodiment of the device.
Figure 6:
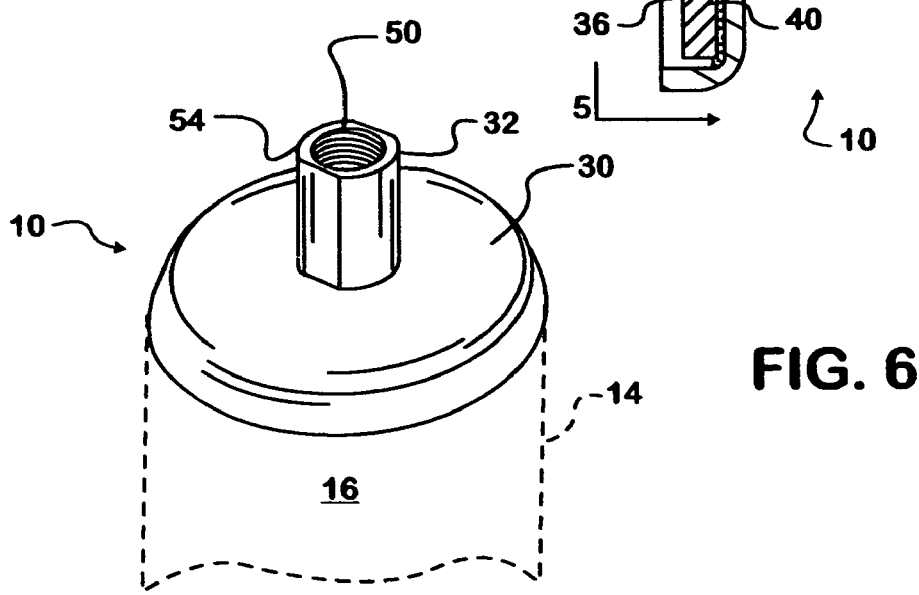
FIG. 6 is a perspective view opposite that of FIG. 5.

In FIGS. 4–6, another embodiment of the attachment device 10 is illustrated which varies from the previous embodiment by providing the collar 32 as a separate structure from the base 30. Accordingly, the collar 32 and base 30 must be attachable to one another and for this purpose a secondary threaded bore 60 is provided which extends from an inner end 62 of the threaded bore 50 and extends to and aligns with a bore 63 formed at a center point in the face 34 of the base plate 30, in an area surrounded by the magnets 36. A suitable fastener 64, such as a bolt 64, is passed through the bore 63 in the plate 30 and into the secondary bore 60, securing the base plate 30 and the collar 32 together.

In this embodiment, the collar 32 has an angulated outer periphery 54 to accommodate application of a hand tool thereabout.

Once the collar 32 and the base plate 30 are appropriately engaged, the base plate 30 is magnetically engaged to the end 14 of the rotatable shaft 16.

Figure 8:
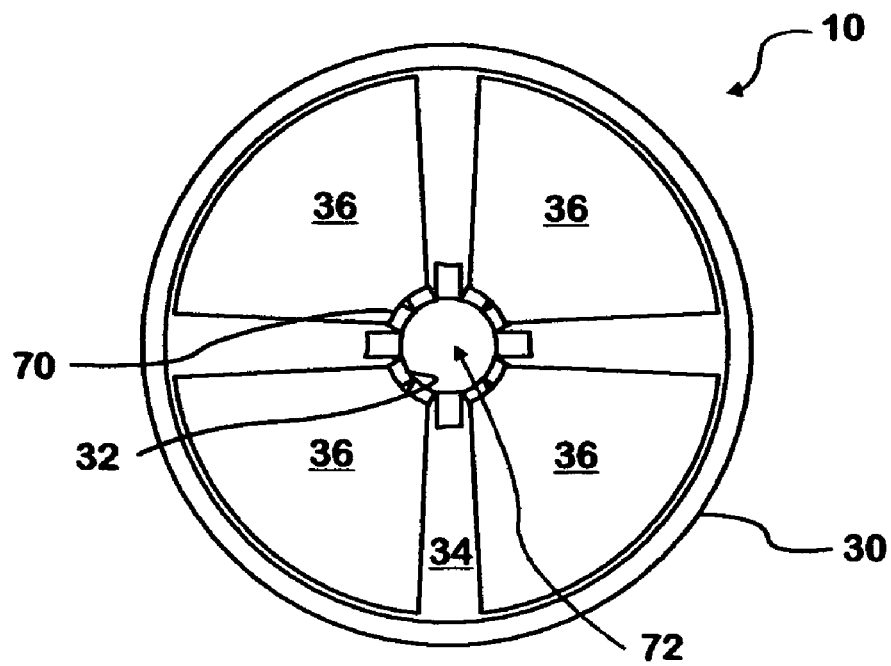
FIG. 8 is a perspective view of the device taken along line 8—8 of FIG. 7.
Figure 7:
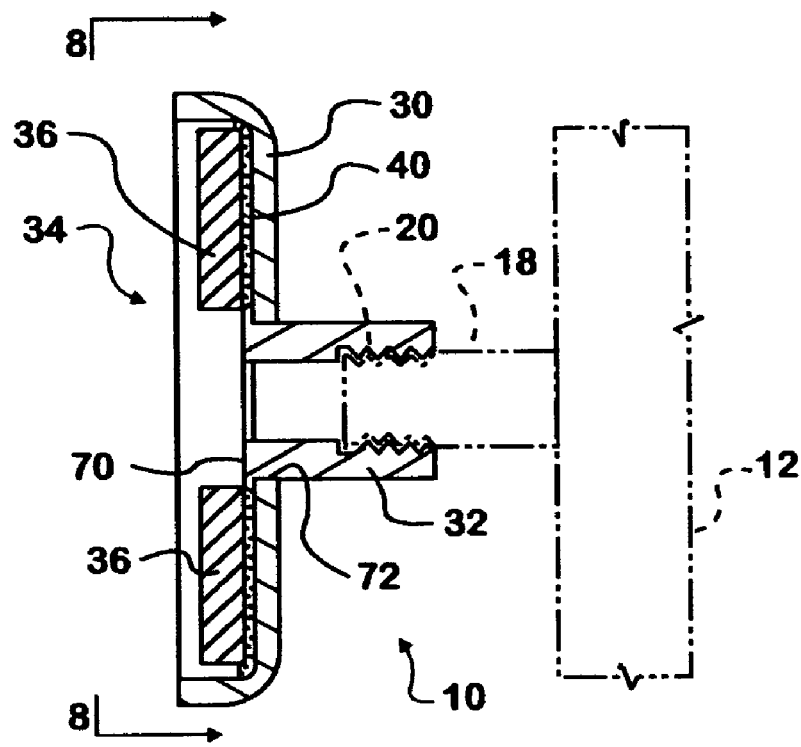
FIG. 7 is a cross sectional view through a third embodiment of the device.

FIG. 7 and 8 are provided to exemplify a further embodiment of a device 10 wherein the base plate 30 and collar 32 are again formed separately but here are illustrated as being joined together by pressing of an inner end 70 of the collar 32 which is cylindrical in this embodiment through a centered orifice 72 in the base plate 30, with portions of the inner end 70 of the collar 32, interior of the face 34 of the base plate 30, being rolled or formed over and about the orifice 72 against the material of the hollowed-out face 34.

Thus, it will be understood that various types of suitable engagements may be created to hold the base plate 30 and collar 32 together when these structures are formed separately.

FIGS. 9–11 illustrate the attachment device 10 in a preferred embodiment thereof.

As shown, the device 10 includes a base plate 30 and a collar 32. In this embodiment, the collar 32 is inwardly stepped at opposed areas 80 creating flats 81 engageable by a tool (not shown), the device 10 is unitary, and preferably produced from stainless steel, with the stepped collar 32 being centered relative to the base plate 30 and including a threaded bore 50 therein.

The free end portion 82 of the collar 32 is thus configured similarly to that of the embodiment of FIGS. 1–3, being shown to incorporate a wall 84 thicker than that of the prior embodiments.

Magnets 36 are also radially positioned within the hollowed-out face 34 of the base plate 30, again being fixed in position through use of an epoxy compound 40, though this means of fixation should not be construed as limiting.

Thus, it will be seen from the various embodiments presented hereinabove that structural variations can be easily made while still providing a functional device 10.

It will be understood that, regardless of configuration of the attachment device 10, the spindle 18 and shaft 16 rotate in identical manner.

As described above, the attachment device 10 of the present invention offers a number of advantages, some of which have been described above and others of which are inherent in the invention. Also modifications may be proposed to the attachment device 10 beyond those exemplified hereinabove without departing from the teachings herein. Accordingly the scope of the invention is only to be limited as necessitated by the accompanying claims.

What is claimed is:

1. An attachment device for engaging a sensor via a universal rotational sensor mount including a rotatable spindle, to an end of a rotating shaft, the device consisting essentially of a base plate including at least one magnet therein and a centered collar extending outwardly of the base plate in a direction opposite that of the at least one magnet, the collar having a threaded bore therein for threadedly engaging the spindle of the universal rotational sensor mount, with the at least one magnet in the base plate engaging the device to the end of the rotating shaft.

2. The device of claim 1 wherein the device is unitary.

3. The device of claim 1 wherein the base plate and collar are separate structures.

4. The device of claim 1 wherein the base plate has a hollowed out face.

5. The device of claim 4 wherein the at_least one magnet is seated within the hollowed out face.

6. The device of claim 5 wherein the at least one magnet is engaged within the face by an epoxy.

7. The device of claim 3 wherein the base plate has a center orifice therein.

8. The device of claim 7 wherein the collar has an inner end which extends through the orifice in the base plate and mechanically engages the base plate.

9. The device of claim 7 wherein the collar has a secondary threaded bore which aligns with the center orifice in the base plate, the collar being fixed to the base plate with a threaded connector.

10. The device of claim 9 wherein the threaded connector is a bolt.

* * * * *